Jan. 31, 1956
B. CORNELISON
2,732,718
GRAVITY METER
Filed Aug. 24, 1951
2 Sheets-Sheet 1
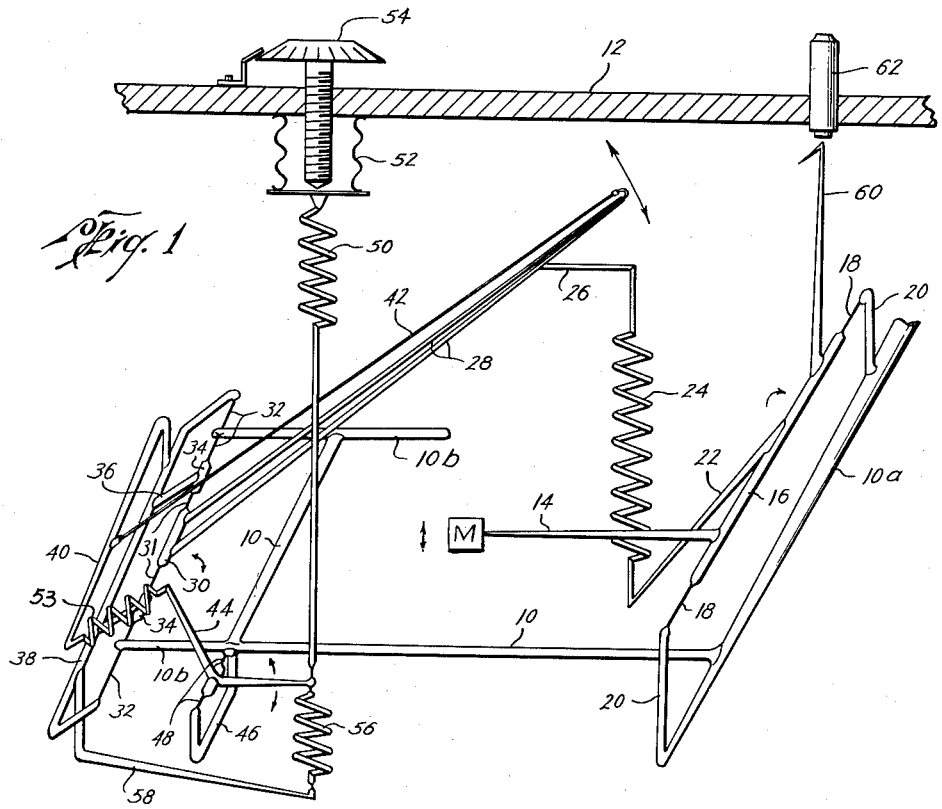
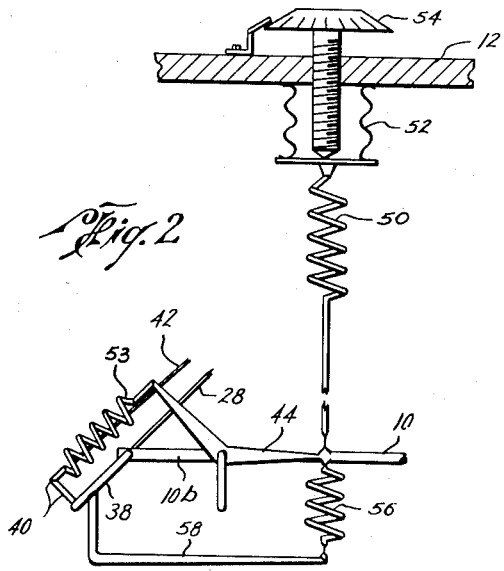
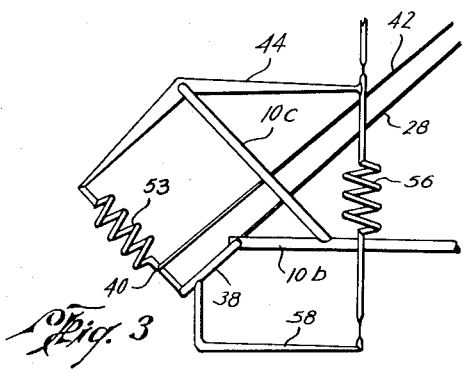
Boyd Cornelison
INVENTOR.
BY James F. Weiler
ATTORNEY Jan. 31, 1956   B. CORNELISON   2,732,718
GRAVITY METER
Filed Aug. 24, 1951   2 Sheets-Sheet 2
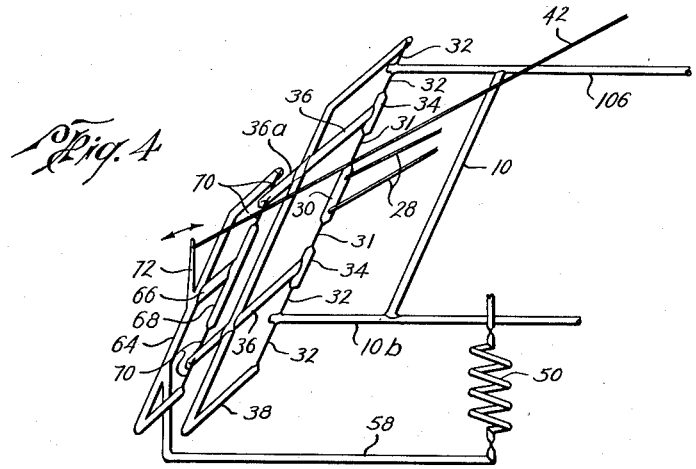
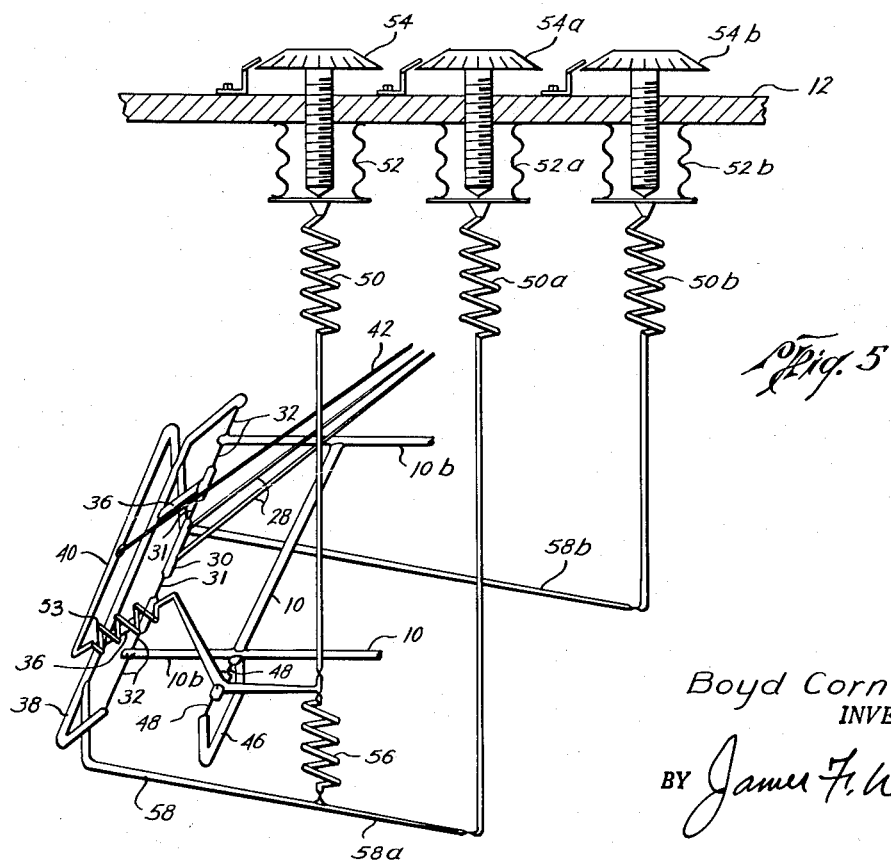
Boyd Cornelison
INVENTOR.
BY James F. Weiler
ATTORNEY

United States Patent Office 2,732,718
Patented Jan. 31, 1956

2,732,718
GRAVITY METER

Boyd Cornelison, Houston, Tex., assignor, by mesne assignments, to Texas Instruments Incorporated, Dallas, Tex., a corporation of Delaware Application August 24, 1951, Serial No. 243,483

15 Claims. (Cl. 73—382)

The present invention relates to gravity meters and, more particularly, relates to fully temperature compensated gravity meters.

To those skilled in the art there is a well recognized problem that non-thermostatically controlled gravity meters are difficult to compensate sufficiently for changes in temperature for all conditions varying with ambient temperatures and the total force of gravity. The first problem was that of adjusting the temperature compensation so that it was constant for a sufficiently wide range of temperatures to provide a fully temperature compensated gravity meter. The first problem has been overcome by the "Worden" gravimeter which, so far as is known at this time, is the only instrument which attains temperature compensation to a sufficient degree over a range of temperature sufficiently wide to allow practical operations. The Worden gravity meter is described in the application of Samuel P. Worden, Serial No. 790,346, filed December 8, 1947 for a Gravity Meter.

Temperature compensation varies inversely in proportion to total gravity. The mainspring has a total length depending on and varying with the total force of gravity. Thus the degree of compensation necessary in any one instrument depends on the length of this mainspring and it can be seen that any gravimeter adjusted for temperature compensation at one value, such as a low value of 979.000, would not be sufficiently temperature compensated if transported to an area where the total force of gravity is a different value, say 980.000. This lack of temperature compensation of course would be due to the changed length of the mainspring which at the higher gravity would have to counteract the larger force of gravity acting on the mass. The mainspring would be longer. Thus temperature compensation mechanism of gravimeters must be adjusted for changes in the total force of gravity if reliable and accurate results are to be obtained over a large range.

It is a prime object of the present invention to provide a gravity meter which is fully temperature compensated both for changes in temperature and for changes in total gravity.

It is a further object of the present invention to provide a gravimeter which is fully temperature compensated for changes in temperature and for changes in total gravity by means of the controlled action of a single mechanism.

It is yet a further object of the present invention to provide a gravity meter which is automatically fully temperature compensated both for changes in temperature and for changes in total gravity.

Other and further objects and features will be apparent from the following description of an example of the invention, for the purpose of disclosure, taken in conjunction with the accompanying drawings, in which like character references designate like parts throughout the several views and in which:

Fig. 1 is a perspective view of a gravimeter constructed in accordance with the present invention, Fig. 2 is a fragmentary side view of the control compensator mechanism of Fig. 1, Fig. 3 is a fragmentary side elevation similar to Fig. 2, but illustrates a modification thereof, Fig. 4 is a fragmentary perspective view illustrating a modification constructed in accordance with the invention, and Fig. 5 is a fragmentary perspective view illustrating a manner in which the example illustrated by Fig. 1 may be adjusted by a plurality of micrometers.

Before describing the drawings in detail it is well to point out that only the bare essentials of the system and of the mechanism to provide a fully temperature compensated gravimeter both for changes in temperature and for changes in total gravity are shown because to add all the details would make the description unduly complicated without adding anything to the essential features of the invention.

Referring now particularly to Fig. 1 of the drawings, a main frame, generally indicated by the reference numeral 10, is provided and a fragmentary portion of a casing 12 in which to house the system is illustrated. As indicated, the main frame 10 consists of a plurality of frame members rigidly secured together and rigidly secured to the casing (not shown) such as illustrated by the fragmentary portion 12.

The moving system comprises a mass M secured to the free extremity of a cross arm 14 whose opposite extremity is rigidly secured to the spindle 16, which is free to rotate about its longitudinal axis by means of the beam hinges 18 securing the spindle 16 to the upstanding arms 20 of the frame member 10a. Extending centrally of the beam or spindle 16 is a lower mainspring arm 22 whose free extremity is secured to the lower end of the mainspring 24. The upper extremity of the mainspring 24 is secured to the upper mainspring arm 26 whose inner extremity is rigidly secured to the upper end of the temperature compensating frame members 28. Preferably, the arms 22 and 26 are so arranged that the mainspring 24 may be positioned in a substantially vertical position, as illustrated.

The lower ends of the temperature compensator frame members 28 are rigidly secured to the spindle or compensator beam 30 rotatable about the compensator hinges 31. A pair of reset beams 34 are secured to the spindle 30 and to the frame by means of the reset hinges 32. Thus the beams 30 and 34 are free to independently rotate about a longitudinal axis.

The arms 36 extend from the spindles 34 to the substantially U-shaped frame 38 whose free ends are secured to the reset hinges 32. Thus the U-shaped frame arm 38 rotates as a unit with the reset beams 34 about the reset hinges 32.

Rigidly secured to the U-shaped frame member 38 is an overturned arm 40 which constitutes a non-linear cantilever spring. Located at a suitable point on the cantilever spring 40 is a terminal point of an arm, such as a metallic wire 42, whose opposite extremity is secured to the upper extremity of the temperature compensator frame members 28. Thus it will be seen that the metallic wire 42 and the compensator frame members 28 constitute a bimaterial unit sensitive to temperature changes and producing a movement at its upper extremity in the direction of the arrows. This movement through the arm 26 moves the upper end of the mainspring 24 thereby changing the length of the mainspring and the angle through which it pulls.

In order to control the movement of the cantilever spring 40 to relax or increase tension in the wire 42, a bell crank 44 is rotatably secured by means of the hinges 48 to a U-shaped frame member 46 which is rigidly secured to the frame member 10. An end of one arm of the bell crank 44 is rigidly secured to the lower end of reset spring 50 and an extremity of the other arm of the bell crank 44 is rigidly secured to the tension spring 53 whose other extremity is rigidly secured to the outer end of the cantilever spring 40. The upper end of the resetting spring 50 is secured to the bellows 52, which in turn is secured to and actuated by a conventional micrometer 54.

Thus, it will be seen that the action of the spring 50 working through the cantilever 40 to relax or tighten the wire 42 will rotate the compensator frame 28 and in so doing act as a reset mechanism which at the same time changes the temperature compensation of the bimaterial temperature compensator.

In order to provide a resetting action of sufficient magnitude to accomplish the desired result of changing the temperature compensation by the proper amount, an auxiliary spring 56 is attached to an end of the bell crank 44 and an extremity of the substantially L-shaped arm 58, which in turn is rigidly secured at its other extremity to the substantially U-shaped frame member 38. It can be seen from the drawing that movement of the arm 58 causes a rotation of the entire compensating mechanism as a unit, thus effecting further resetting of the instrument range. Thus, the reset range lacking after the effects of moving spring 53 and the cantilever 40 is accomplished by the action of spring 56 on the arm 58. The magnitude of this action is easily controlled through spring 56.

As illustrated in Fig. 1 a pointer 60 having an overturned end extends upwardly from the spindle 16 and indicates variations in the position of the mass M. The end of the pointer 60 may be viewed through the microscopes 62 for nulling purposes.

Automatic temperature compensation over wide ranges of total force of gravity is obtained by the device in the following manner:

The device may be nulled by means of adjusting the micrometer 54 and viewing the pointer 60 through the microscope 62. Manipulation of the micrometer screw 54 will relax or increase the tension in the resetting spring 50, which relaxation or increase in tension is transmitted through the bell crank 44 to increase or reduce the tension in spring 53 thereby relaxing or increasing the tension of cantilever 40 and in turn relaxing or increasing the tension in the wire 42, thereby changing the magnitude of the temperature responsive action by increasing or decreasing the curvature of the wire 42. The non-linear action of the wire 42 is fully described in the above identified copending application and no more description is deemed necessary. The wire 42 and the temperature compensator arms 28 constitute a bimaterial temperature sensitive mechanism. Thus, the upper extremity of the temperature compensator arms 28 will be moved in the direction of the arrows by such increase or decrease in tension thereby changing the length of the mainspring 24 and the angle through which it works and thereby providing some resetting action. Through suitable adjustment of the relative tension of springs 50 and 53 and of the angle through which they pull, a desired increase or decrease in tension in the wire 42 is obtained. In addition, the movement of the arm 58 controlled by the spring 56 rotates the entire temperature compensating mechanism as a unit. Thus there is a resetting action and a relaxing or increasing in tension of the arm 42 of the bimaterial unit thereby providing the necessary revision in temperature compensation automatically through a wide range of total gravity force.

To more fully explain the operation of the temperature compensating mechanism the following example is given. As the temperature of the element rises, the expansion of the metallic wire 42 is greater than that of the compensator frame 28. This moves the top of the mainspring in such a direction that the force exerted by the mainspring will be lessened, partly due to its shortened length and partly due to changing the angle through which the mainspring pulls. By proper geometrical construction the sensitivity of the instrument remains constant throughout this movement. By adjusting the length of the lever arm of this bimaterial temperature sensitive mechanism, which lever arm is in effect the distance from the compensator hinges 32 to the wire 42, the desired movement can be obtained for a given change in temperature. Since the change in the degree of compensation needed by any mainspring is a nonlinear relation with respect to temperature, it is necessary to counteract this by a non-linear movement of the compensating mechanism. Since the curved metallic wire 42 is under tension through the cantilever arm 40, the suitable non-linear movement is obtained through manipulation of the tension of the non-linear wire 42. It will be further understood that the greater the tension on the wire 42, the greater will be the movement of the compensator for a given change in temperature. Thus, as the wire 42 becomes cooler, it will contract causing greater tension and reduced curvature which in turn raises the degree of compensation at this lower temperature. The adjustment of such mechanism is considered to be relatively simple for one skilled in the art and the controlled non-linear action thus obtained from the compensating device solves the problem of making the temperature compensation of any mainspring linear through a wide range of temperature.

In addition, it will be understood that the rotation of the entire temperature compensating mechanism by the arm 58 through the auxiliary spring 56 effects a resetting of the instrument range. The magnitude of this action, of course, is easily controlled through the spring 56, and can be adjusted to automatically balance the change in the temperature compensating action effected through the action of the cantilever 44 in response to change in tension of the spring 50.

In the example of Figs. 1 and 2, and by reference to Fig. 2, of the drawings it is seen that the bell crank action is such as to alter the force exerted by the spring 53 in a direction substantially parallel to the wire 42. In this case the degree of temperature compensation is altered solely by changing the tension and thereby the amount of curvature in the wire 42. This angle may be changed as desired however, and a modification is illustrated in Fig. 3.

In Fig. 3 an additional frame member 10c extends upwardly and rearwardly to which the bell crank 44 is secured. The spring 53 is thus positioned to work at right angles to the wire 42. In order to shorten or lengthen the lever arm of the compensating mechanism and govern the degree of over-all temperature compensation, it is readily seen that after wire 42 is moved closer to the compensator hinges 32, a greater movement for the given change in temperature will ensue. Other than this change the remainder of the construction is identical with that of Fig. 1. It will be understood that the examples of Figs. 2 and 3 are illustrative only, and a combination of both these actions is contemplated by the invention and is considered a relatively simple adjustment.

Fig. 4 illustrates an alternative method and means of achieving the automatic change in temperature compensation over a wide range in total force of gravity without the use of the bell crank 44 or the use of the auxiliary spring 53 and 56. As illustrated, only one resetting spring 50 is necessary and the rigid arm 58 connecting the reset spring 50 to the hinge system connects to an added secondary substantially U-shaped rigid frame 64 instead of the rigid frame 38. The frame 64 has an arm 66 extending substantially at its central portion to the beam 68, the auxiliary rigid frame indicated by the numerals 64, 66 and 68 being secured to the extensions 36a of the arms 36 by means of the reset hinges 70. An arm 72 extends upwardly centrally of the frame member 64 to which is secured at its upper extremity the end of the wire 42, which is secured to the cantilever arm 40 in Fig. 1. The remaining portions of the instrument are identical so that of Fig. 1.

The operation of the embodiment of Fig. 4 is as follows:

As the tension in spring 50 is changed a rotation of the entire hinge system, including both frames 64 and 38 about reset hinges 32, occurs, causing a rotation of the temperature compensating mechanism including the frame 28 and the wire 42. This action is purely a resetting action and has no effect on the temperature compensating mechanism. It will be seen, however, that due to the auxiliary hinges 70, there will be a simultaneous additional rotation of frame 64 only about hinges 70, which rotation moves the rigid member 72 in the direction of the arrows. The movement of this member 72 to which is connected the lower extremity of the wire 42 changes the tension of the wire 42 and in so doing alters the temperature compensation of the temperature compensator mechanism when the instrument reset mechanism is operated. To further clarify this action, the rotation of the system about the hinges 32 moves the frames 38 and 64 and the bimaterial structure 28 and 42 as a unit without relative motion between the frame 64 and the bimaterial structure 28 and 42; whereas, rotation of the frame 64 about the hinges 70 alters the temperature compensation and supplies a part of the desired resetting action, the additional resetting action is supplied by the rotation of the frame 38. To those skilled in the art the adjustment of the hinges 70 and 32 to the correct relative strength to give the desired effect, is considered a relatively simple operation.

Fig. 5 illustrates how examples of the present invention may be actuated by a plurality of micrometers in order to obtain extremely accurate adjustments throughout a wide range of total force gravity. The example of the invention illustrated in Fig. 5 is substantially identical to that of Fig. 1 except that a plurality of micrometers 54, 54a and 54b are secured to the casing or frame 12 to actuate the bellows 52, 52a and 52b, respectively, which in turn control the tension in the reset springs 50, 50a and 50b, respectively. In this example the lower extremity of the spring 50a is secured to an extension 58a of the arm 58 and a second arm 58b is rigidly connected to the lower end of the spring 50b, the arm 58b being connected at its other end to the frame 38. Obviously, these springs could be connected to an extension of the bell crank 44 or tied into the system at any appropriate place. The spring members 50, 50a and 50b are relatively or progressively strong and weak. Thus the primary micrometer dial may be utilized to approximately null the instrument or to bring it within the range of the total force of gravity and the secondary micrometers or control means may be utilized to complete an accurate nulling of the instrument. Such an arrangement is particularly useful in making large range geodetic surveys or in making measurements of the change in gravity over a large range or barriers and the like.

It is obvious that, if desired, the system may be nulled by a single or a plurality of dials and for a further description of such a system reference is made to the copending application filed jointly with Samuel P. Worden, Serial No. 140,124, filed January 23, 1950, for a large range gravity sensitive instrument.

It is appropriate to note an advantage of the system illustrated in Fig. 1 in that the two springs 50 and 56 working together provide greater opportunity for obtaining an overall linear relation with respect to the action micrometer 54 of the spring 50.

It is also appropriate to note that the drift caused by a slow but continuous yielding of the elastic parts of the systems in gravimeters may be constantly corrected in the present invention by resetting small amounts. In other gravity instruments it has been found that instruments several years of age have undergone yielding of the mainspring to the extent that it is appreciably longer than its original length. Because of this yielding of the mainspring the temperature compensation is no longer correct and the instrument must be adjusted in the laboratory. As stated heretofore, in the present invention, this yielding is automatically compensated for by the resetting necessary to keep the system balanced or on scale. A further advantage of the automatic temperature compensating mechanism is that when the instrument is finally drifted to the end of the range of its adjusting micrometer or micrometers, both the range and temperature compensation may be easily corrected by a simple adjustment of the reset spring 50.

Thus, it will be seen that the present invention provides a gravimeter which automatically adjusts itself for temperature compensation over a wide range of total force of gravity. In addition, the device is easily readjusted after considerable drift.

It seems obvious that numerous changes may be made in the details of construction and arrangement of parts, and the gravimeter may be nulled by means of a single or plurality of micrometer dials or means.

Thus, the invention is to be limited not by the precise details given for the purposes of disclosure, but only by the spirit of the invention and the scope of the following claims.

What is claimed and desired to be secured by Letters Patent is:

1. A temperature compensated gravity measuring device comprising, a gravity responsive system including a moveably supported mass displaceable in response to gravity, the extent of such displacement being affected by temperature variation, an adjustable temperature compensating structure connected at each end to said system, said temperature compensating structure comprising bimaterial arms joined at one end and joined at spaced points at their other ends, and resetting means connected to said system and one of said arms operable to restore the mass to a predetermined indicated position and operable to adjust the space between said other ends of said arms and thereby adjust the temperature compensation structure for variations in gravity on restoring said mass to said predetermined indicated position.

2. A gravity measuring device comprising, a first moveable support, a mass extending from said first moveable support, yieldable means supporting and suspending said mass, a second moveable support, a frame extending from said second moveable support and connected to and supporting said yieldable means, a third moveable support spaced from and moveably secured to said second moveable support, an arm extending from said third moveable support and joined at its extremity to said frame, said frame and arm defining a bimaterial temperature compensation structure to compensate for temperature variation changes in said yieldable means, and nulling means connected to said third movable support operable to move said third moveable support to restore said mass to a predetermined indicated position and operable to simultaneously move said second moveable support to adjust the space between said arm and frame thereby adjusting the temperature compensation of said bimaterial temperature compensating structure for variations in gravity.

3. A temperature compensated gravity measuring device comprising, a first support rotatable about its longitudinal axis, a mass extending from said first support, yieldable means supporting and suspending said mass, a second support rotatable about its longitudinal axis and spaced from said first support, a frame extending from said second support and connected to and suspending said yieldable means, a third support spaced from and independently rotatable about the longitudinal axis of said second support, an arm extending from said third support and joined at its extremity to said frame, said frame and arm defining a bimaterial temperature compensation structure to compensate for temperature variation changes in said yieldable means, and nulling means connected to said third support operable to rotate said third support to restore said mass to a predetermined indicated position and operable to simultaneously rotate said second support to adjust the space between said frame and arm thereby adjusting the temperature compensation of said bimaterial temperature compensating structure for variations in gravity.

4. A temperature compensated gravity measuring device comprising, a first support rotatable about its longitudinal axis, a mass extending from said first support, yieldable means supporting and suspending said mass, a second support rotatable about its longitudinal axis and spaced from said first support, a frame extending from said second support and connected proximate its free extremity to and supporting said yieldable means, a third support spaced from and independently rotatable about the longitudinal axis of said second support, a cantilever spring secured to said third support, an arm extending from said cantilever spring and joined at its free extremity to the free extremity of said frame, said frame and arm defining a bimaterial temperature compensation structure, tension in said arm being controlled by said cantilever spring, a bell crank, yieldable means connecting an arm of said bell crank to said cantilever spring, additional yieldable means connecting another arm of said bell crank to said third support, and nulling means yieldingly connected to said bell crank operable to rotate said bell crank and thereby rotate said second and third supports as a unit and relative to one another thereby relaxing or increasing the tension in said arm whereby said mass is restored to a predetermined indicated position and the temperature compensation of said temperature compensated device is simultaneously adjusted for variations in gravity.

5. A temperature compensated gravity measuring device comprising, a first support rotatable about its longitudinal axis, a mass extending from said first support, yieldable means supporting and suspending said mass, a second support rotatable about its longitudinal axis and spaced from said first support, a frame extending from said second support and connected proximate its free extremity to and supporting said yieldable means, a third support spaced from and independently rotatable about the longitudinal axis of said second support, arms extending from said third support, a fourth support rotatably secured to said arms, a member extending from said fourth support to the free extremity of said frame, said member and frame defining a bimaterial temperature compensation structure to compensate for temperature variation changes in said yieldable means, and nulling means yieldably connected to said fourth support operable to rotate said second, third and fourth supports as a unit and operable to rotate said fourth and second supports relative to one another and thereby relax or increase the tension in said member whereby said mass is restored to a predetermined indicated position and the temperature compensation of said temperature compensating structure is simultaneously adjusted for variations in gravity.

6. A temperature compensated gravity measuring device comprising, an elastic system including a mass, a movable support, yieldable means suspending the mass, a temperature compensating structure comprising two members of different thermal expansion joined adjacent one end and disposed in spaced relation adjacent their other ends, one of said members including means which imparts thereto a nonlinear resiliency along an axis connecting said one end and said other ends whereby temperature variations effect a nonlinear relative lateral movement to said one end and said other ends, said one end of the temperature compensating structure linked to the yieldable means, a pair of spaced movable supports, the other ends of said members connected to one and the other of said movable supports, respectively, the temperature responsive lateral movement of the other end being adjusted in amplitude and linearity and having a component in the direction of action of the yieldable means for compensating for temperature variations, and resetting means linked to one of said members operable to restore the mass to a predetermined indicated position and operable to move said one member relative to the other member and thereby adjust the temperature-responsive lateral movement of said one end whereby the temperature compensating structure is adjusted for variations in gravity on restoring said mass to said predetermined indicated position.

7. A temperature compensated gravity measuring device comprising, a gravity responsive system including a movably supported mass displaceable in response to gravity, the extent of such displacement being effected by temperature variations, a temperature compensating structure comprising two members of different thermal expansion joined adjacent one end and disposed in spaced relation at their other ends, one of said members including means which imparts thereto a nonlinear resiliency along an axis connecting said ends whereby temperature variations effect a nonlinear relative lateral movement to said ends, said temperature compensating structure being linked adjacent each end to said system, the temperature responsive lateral movement of the other end being adjusted in amplitude and linearity and having a component in the direction of action of the mass, and resetting means connected to said system and one of said members operable to restore the mass to a predetermined indicated position and operable to move said one member relative to the other member thereby adjusting the temperature-responsive lateral movement of said one end whereby the temperature compensating structure is adjusted for variations in gravity on restoring said mass to said predetermined indicated position.

8. A temperature compensated gravity measuring device comprising, a gravity responsive system including a movably supported mass displaceable in response to gravity, the extent of such displacement being effected by temperature variation, an adjustable bimaterial temperature compensating structure connected at each end to said system, said bimaterial temperature compensating structure comprising a plurality of members of different thermal expansion joined adjacent one end and disposed in spaced relationship adjacent their other ends, and resetting means linked to said bimaterial temperature compensating structure and said gravity responsive system operable to restore the mass to a predetermined indicated position and operable to adjust the space between said other ends of said members and thereby adjust the temperature compensating structure for variations in gravity on restoring said mass to said predetermined indicated position.

9. A temperature compensated gravity measuring device comprising, a gravity responsive system including a movably supported mass displaceable in response to gravity, the extent of such displacement being effected by temperature variation, an adjustable temperature compensating structure connected at spaced points to said system adapted to compensate for such temperature variation, said temperature compensating structure comprising bimaterial arms joined adjacent one end and disposed in spaced relationship adjacent their other ends, and resetting means comprising first elastic means connected to said system and operable to restore said mass to a predetermined indicated position, and second elastic means linked to one of said arms to move said one arm relative to the other arm and thereby adjust the temperature compensating structure for variations in gravity on restoring said mass to said predetermined indicated position.

10. A gravity measuring device comprising, a first movable support, a mass extending from said first movable support, yieldable means supporting and suspending said mass, a second movable support, a frame extending from said second movable support and connected to and supporting said yieldable means, a third movable support spaced from and movably secured to said second movable support, an arm extending from said third movable support and joined adjacent its extremity to said frame, one of said arm and frame including means which imparts thereto a nonlinear resiliency along an axis connecting said arm and frame whereby temperature variations effect a nonlinear relative lateral movement to the ends of said arm and frame, said frame and arm defining a bimaterial temperature compensating structure to compensate for temperature variation changes in said yieldable means, the temperature responsive lateral movement of the ends being adjusted in amplitude and linearity and having a component in the direction of action of the yieldable means for compensating for temperature variations, and nulling means connected to said third movable support operable to move said third movable support to restore said mass to a predetermined indicated position and operable to simultaneously move said second movable support to adjust the space between said arm and frame thereby adjusting the temperature compensation of said bimaterial temperature compensating structure for variations in gravity.

11. A temperature compensated gravity measuring device comprising, a first support rotatable about its longitudinal axis, a mass extending from said first support, yieldable means supporting and suspending said mass, a second support rotatable about its longitudinal axis and spaced from said first support, a frame extending from said second support and connected adjacent its free extremity to and supporting said yieldable means, a third support spaced from and independently rotatable about the longitudinal axis of said second support, a cantilever spring secured to said third support, an arm extending from said cantilever spring and joined adjacent its free extremity to said frame, tension in said arm being controlled by said cantilever spring, said frame and arm defining a bimetal temperature compensating structure, one of said frame and arm including means which imparts thereto a nonlinear resiliency along an axis connecting said frame and arm whereby temperature variations effect a nonlinear relative lateral movement to the ends of said frame and arm, the temperature responsive lateral movement of the free end being adjusted in amplitude and linearity and having a component in the direction of action of the yieldable means for compensating for temperature variations, a bell crank, means yieldably connecting an arm of said bell crank to said cantilever spring, additional means yieldably connecting another arm of said bell crank to said third support, and nulling means yieldably connected to said bell crank operable to rotate said bell crank and thereby rotate said second and third supports as a unit and relative to one another thereby relaxing or increasing the tension in said arm whereby said mass is restored to a predetermined indicated position and the temperature compensation of the temperature compensating device is simultaneously adjusted for variation in gravity.

12. A temperature compensated gravity measuring device comprising, a first support rotatable about its longitudinal axis, a mass extending from said first support, yieldable means supporting and suspending said mass, a second support rotatable about its longitudinal axis and spaced from said first support, a frame extending from said second support and connected to and supporting said yieldable means, a third support spaced from and independently rotatable about the longitudinal axis of said second support, arms extending from said third support, a fourth support rotatably secured to said arms, a member extending from said fourth support and joined to said frame, said member and frame defining a bimaterial temperature compensation structure to compensate for temperature variation changes and including means which imparts thereto a nonlinear resiliency along an axis connecting said member and frame whereby temperature variations effect a nonlinear relative lateral movement to said ends, the temperature responsive lateral movement of the free extremity of said temperature compensating structure being adjusted in amplitude and linearity and having a component in the direction of action of the yieldable means for compensating for temperature variations, and nulling means yieldably connected to said fourth support operable to rotate said second, third and fourth supports as a unit and operable to rotate said fourth and second supports relative to one another and thereby restore said mass to a predetermined indicated position and thereby relax or increase the tension in said member whereby said mass is restored to a predetermined indicated position and the temperature compensation of said temperature compensating structure is simultaneously adjusted for variations in gravity.

13. The temperature compensated gravity measuring device of claim 11 where the bell crank is so arranged that the force exerted by the cantilever spring is in a direction substantially parallel to that of the arm.

14. The temperature compensated gravity measuring device of claim 11 where the bell crank is so arranged that the direction of action of the cantilever spring is substantially at right angles to that of the arm.

15. The temperature compensated gravity measuring device of claim 8 where the resetting means comprises a plurality of relatively weak and strong means linked to said bimaterial compensating structure and said system whereby said mass is restored to approximately the predetermined indicated position by said strong means and completely restored thereto by said weak means.

References Cited in the file of this patent

UNITED STATES PATENTS

| | | |
|---|---|---|
| Re. 20,137 | Hartley | Oct. 20, 1936 |
| 1,998,345 | Truman | Apr. 16, 1935 |
| 2,159,082 | Hartley | May 23, 1939 |
| 2,290,740 | Clewell | July 21, 1942 |
| 2,357,356 | Petty | Sept. 5, 1944 |
| 2,383,997 | Sweet | Sept 4, 1945 |